United States Patent
Courtney

(10) Patent No.: US 7,328,122 B2
(45) Date of Patent: Feb. 5, 2008

(54) SPEED SENSOR

(75) Inventor: Christopher J. Courtney, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 11/282,932

(22) Filed: Nov. 18, 2005

(65) Prior Publication Data

US 2007/0118327 A1    May 24, 2007

(51) Int. Cl.
*G01P 11/00* (2006.01)
(52) U.S. Cl. ..................................................... 702/142
(58) Field of Classification Search ................ 702/142, 702/145
See application file for complete search history.

(56) References Cited

U.S. PATENT DOCUMENTS

| | | | |
|---|---|---|---|
| 4,162,443 A * | 7/1979 | Brearley et al. | 324/76.58 |
| 4,485,452 A * | 11/1984 | Cording et al. | 702/147 |
| 4,527,248 A * | 7/1985 | Takase et al. | 702/145 |
| 4,881,174 A * | 11/1989 | Gimmler | 702/78 |
| 5,440,602 A * | 8/1995 | Gimmler et al. | 377/20 |
| 7,248,991 B2 * | 7/2007 | Goebel et al. | 702/148 |

FOREIGN PATENT DOCUMENTS

GB    2 073 980    * 10/1981

* cited by examiner

*Primary Examiner*—Michael Nghiem
(74) *Attorney, Agent, or Firm*—Carlson, Gaskey & Olds

(57) ABSTRACT

A speed sensor includes a magnetic pickup generating a cyclical output based upon passing teeth of a rotating gear. A counter counts the number of clock pulses that are generated during a measurement period of the cyclical output. The measurement period, in terms of cycles of the cyclical output, is varied based upon the number of pulses that were counted in a previous measurement period. Thus, at lower speeds, the number of clock pulses generated during fewer cycles is counted, while at higher speeds the number of clock pulses generated during more cycles is counted.

18 Claims, 1 Drawing Sheet

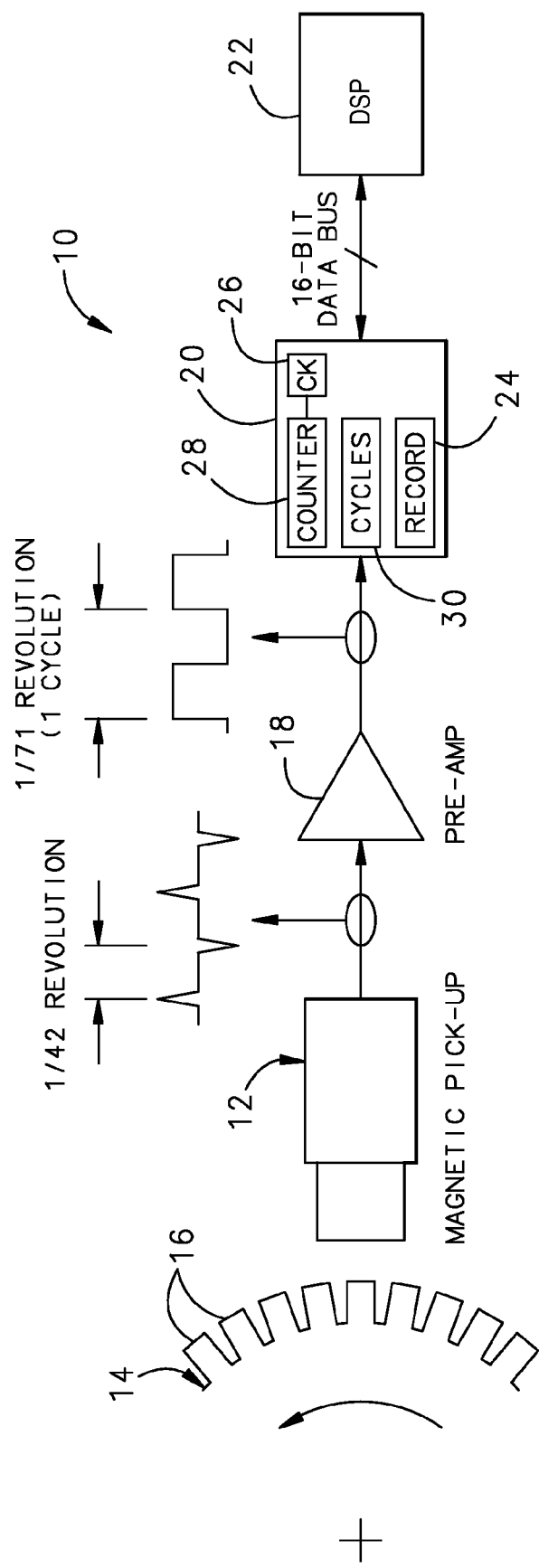

SPEED SENSOR

This invention was conceived in performance under contract F33615-00-2-2002 from the Air Force. The Government may have rights in this invention.

BACKGROUND OF THE INVENTION

This invention relates to a speed sensor and more particularly to a rotational speed sensor with improved resolution.

Rotational speed is measured in many different applications, including a starter/generator for aircraft. Existing sensors utilize a magnetic pickup generating a cyclical output based upon passing teeth of a rotating gear. A counter counts a number of clock pulses that are generated during each cycle. In order to avoid overflowing the counter at low speeds, the speed of the clock pulses must be reduced. However, reducing the clock speed reduces the resolution of the speed sensor at higher speeds.

In order to achieve good resolution for an average speed calculation, a very precise position sensor can be used, such as high precision encoder or resolver. However, the cost and size of the resolver or encoder is not always practical. Additionally, the surrounding environment of the sensor may be too harsh for an encoder or resolver.

SUMMARY OF THE INVENTION

A speed sensor according to the present invention achieves improved resolution for speed calculation across a broader range of speeds, while using a small, low-cost low-resolution sensor. A magnetic pickup generates a cyclical output based upon passing teeth of a rotating gear. A counter counts the number of clock pulses that are generated during a measurement period of the cyclical output. The measurement period represents an angular displacement and is varied based upon the number of pulses that were counted in a previous measurement period. Thus, at lower speeds, the number of clock pulses generated during one cycle (for example) is counted, while at higher speeds the number of clock pulses generated during 128 cycles (for example) is counted.

The number of cycles in the measurement period is increased and decreased based upon the previous measurement period in order to avoid saturation of the clock pulse counter at low speed while providing good resolution at higher speeds. Given the inertia of the rotating system, the rotational speed should change sufficiently slowly for the speed sensor to adapt the measurement period to any changes in rotational speed.

BRIEF DESCRIPTION OF THE DRAWINGS

Other advantages of the present invention can be understood by reference to the following detailed description when considered in connection with the accompanying drawings wherein:

The FIGURE is a schematic of a speed sensor according to one embodiment of the present invention.

DETAILED DESCRIPTION OF A PREFERRED EMBODIMENT

A speed sensor 10 is shown schematically in the FIGURE. The speed sensor 10 includes a magnetic pickup 12 proximate a rotating part, such as a gear 14 having a plurality of teeth 16 (71 teeth, in this example) and a rotational speed (or rotational velocity). In a known manner, the magnetic pickup 12 generates a cyclical output based upon the movement of the teeth 16 of the gear 14 near the magnetic pickup 12. The frequency of the cyclical output is based upon the rotational speed (or rotational velocity) of the gear 14. As illustrated, the magnetic pickup 12 generates a positive peak on the leading edge of each tooth 16 and a negative peak on the trailing edge of each tooth 16 (thus, at a frequency twice the rate at which the teeth 16 pass the magnetic pickup 12). A preamp 18 amplifies the output of the magnetic pickup 12 and converts it to a square wave signal having a frequency equal to the rate at which the teeth 16 pass the magnetic pickup 12. Each cycle of the cyclical output is based upon an angular displacement of the gear 14.

An FPGA 20 (Field Programmable Gate Array) (or other control circuitry) receives the square wave signal from the preamp 18 and is connected to a Digital Signal Processor (DSP) 22 by a bus (a 16-bit bus is shown). The FPGA 20 includes a record length register 24 and a clock 26 generating clock pulses at a known, fixed frequency to a clock pulse counter 28. A cycle counter 30 counts cycles of the cyclical input from the magnetic pickup 12 (via preamp 18). The record length register 24 determines a measurement period, such as a number of cycles of the cyclical output of the magnetic pickup 12, which represents an angular displacement of the gear 14 (the number of cycles relates to the number of teeth 16 that have passed the magnetic pickup 12). During a measurement period, the counter 28 counts clock pulses from the clock 26, while the cycle counter 30 counts cycles from the magnetic pickup 12 to determine when the measurement period is completed. The number of clock pulses counted by the counter 28 indicates an elapsed time. At the end of each measurement period, as determined based upon a comparison of the cycles counted by the cycle counter 30 with the record length in the record length register 24, the DSP 22 reads the counter 28 to determine the elapsed time and the record length register 24 to determine an angular displacement. Based upon the indicated angular displacement in the elapsed period of time, the rotational speed or velocity is determined.

In order to increase the resolution of the speed sensor 10, the record length register 24 is changed by the FPGA 20 based upon a previous number of clock cycles counted by the counter 28 in a previous measurement period. For example, if the number of clock pulses counted exceeds a high threshold, such that the counter 28 is in danger of overflowing in the next few measurement periods, the record length (measurement period) is reduced, such that the number of clock pulses that can be counted will be reduced. Since the measurement period is reduced to a known angular displacement, the rotational speed can be calculated based upon the new measurement period.

Similarly, if the number of clock pulses in a previous measurement period drops below a low threshold, the record length (measurement period) is increased, such that the number of clock pulses that can be counted will be increased and the resolution of the speed sensor 10 is increased. Thus, the speed sensor 10 provides good resolution at low speeds and high speeds.

The record length register 24 may be a 7-bit shift register, such that the record length can be varied from 0 to 127. Preferably, the record length is in the form $2^n-1$, where n is between 0 and 7. The number of cycles during which clock pulses are counted is related to, but not necessarily equal to, the record length. In this example, the number of cycles during which clock pulses are counted is equal to the record length plus one. Therefore, when a single cycle is being measured, the record length is 0, when 128 cycles are being measured, the record length is 127, etc. Whenever the record length is to increase, it is doubled by left-shifting a one into the record length register 24. Whenever the record length is to decrease, the record length register 24 is right-shifted.

The clock 26 may be a 6MHz clock, because the clock 26 can count to $2^{16}-1$, giving a 16-bit output (the size of the data bus) in just over 0.01 seconds, which is the minimum update rate in this example. Other clock frequencies can be used depending upon the minimum update rate and data bus size.

In order to calculate rotational velocity, the DSP 22 reads both the record length register 24 and the counter 28. The FPGA 24 automatically stores the current value of the record length register 24 for subsequent retrieval by the DSP 22 whenever the DSP 22 reads the counter 28. The DSP 22 calculates the (average) rotational velocity, such as by using the following equation (or similar):

$$\text{average } \omega_r = (l_{rec}+1)60 f_{clock}/\Delta N(k)\text{Teeth}$$

where $l_{rec}$ is the current record length (angular displacement in terms of number of teeth), $f_{clock}$ is the clock frequency, $\Delta N(k)$ is the number of clock pulses counted by counter 28 during the measurement period and Teeth is the number of teeth on the gear 14. Other equations could be used.

The thresholds to increase and decrease the record length are chosen based upon a balancing of several issues. First, it is desirable to maximize the measurement period in order to count as many clock pulses as possible to increase resolution and to average out imperfections in the gear teeth 16 spacing. On the other hand, setting the high threshold (before switching to a shorter record length) too high increase the risk of overflowing the counter 28 in the next measurement period if the rotational speed decreases sufficiently. In the example embodiment, a high threshold of 40960 (1010 0000 0000 0000) was chosen and a low threshold (triggering a transition to a larger record length) of 20480 (0101 0000 0000 0000) was chosen. The specific thresholds used will vary in each application.

The speed sensor 10 with dynamic record length provides improved resolution and the ability to handle a wide range of speeds. The counter 28 and record length register 24 are implemented in a low cost FPGA 20.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, the magnetic pickup 12 could be replaced with a Hall effect sensor, or with any device that generates a cyclical or pulse output based upon displacement (rotational or otherwise). Additionally, more than one magnetic pickup 12 (or other such device) could be utilized, especially if directional information is also desired. The FPGA controller and DSP controller could be replaced with other types of controllers or functionally combined together in a single controller.

What is claimed is:

1. A speed sensor comprising:
   a record length register for storing a record length;
   a clock pulse generator generating clock pulses;
   a clock pulse counter counting the clock pulses generated by the clock pulse generator;
   a cycle counter for counting cycles of a cyclical input, the cycle counter being compared to the record length register and the clock pulse counter stops counting clock pulses based upon the comparison between the cycle counter and the record length register; and
   a controller changing the record length stored in the record length register based upon a previous value in the clock pulse counter, the controller determining a speed based upon the clock pulses counted by the clock pulse counter and the record length stored in the record length register.

2. The speed sensor of claim 1 wherein the record length indicates an angular displacement.

3. The speed sensor of claim 1 further including a magnetic pickup generating a cyclical output, the controller determining the speed based upon the cyclical output.

4. The speed sensor of claim 3 wherein the record length indicates a number of cycles of the cyclical output during which the clock pulse counter counts clock pulses.

5. The speed sensor of claim 4 wherein the controller increases the record length when the previous value in the clock pulse counter drops below a low threshold.

6. The speed sensor of claim 5 wherein the controller decreases the record length when the previous value in the clock pulse counter exceeds a high threshold.

7. The speed sensor of claim 6 wherein the high threshold and the low threshold include a hysteresis.

8. The speed sensor of claim 6 wherein the record length register exponentially indicates the record length.

9. The speed sensor of claim 6 wherein the record length register can indicate a minimum record length of one, indicating that the clock pulse counter will count pulses for each single cycle of the cyclical output.

10. The speed sensor of claim 6 further including a rotating gear including a plurality of circumferentially spaced teeth proximate the magnetic pickup.

11. A method for determining a rotational speed of an object including the steps of:
    a) counting clock pulses during a measurement number of cycles of a cyclical input, the cyclical input having a frequency based upon the rotational speed;
    b) increasing the measurement number of cycles of the cyclical input based on a previous number of clock pulses counted during a previous measurement number of cycles of the cyclical input dropping below a low threshold;
    c) counting cycles of the cyclical input;
    d) comparing the number of cycles counted in said step c) to the measurement number of cycles and ceasing to count the clock pulses based upon the comparison between the number of cycles and the measurement number of cycles; and
    e) determining the rotational speed based upon a current number of clock pulses counted during the measurement number of cycles of the cyclical input and based upon the measurement number of cycles.

12. The method of claim 11 wherein the measurement number of cycles of the cyclical input is defined in terms of multiples of cycles of the cyclical input.

13. The method of claim 11 further including the step of generating the cyclical input at the frequency proportional to the rotational speed.

14. The method of claim 11 further including the step of storing the rotational speed determined in said step e) for subsequent retrieval.

15. A method for determining a rotational speed of an object including the steps of:
   a) counting clock pulses during a measurement number of cycles of a cyclical input, the cyclical input having a frequency based upon the rotational speed;
   b) decreasing the measurement number of cycles of the cyclical input based upon a previous number of clock pulses counted during a previous measurement number of cycles of the cyclical input exceeding a high threshold;
   c) counting cycles of the cyclical input;
   d) comparing the number of cycles counted in said step c) to the measurement number of cycles and ceasing to count the clock pulses based upon the comparison between the number of cycles and the measurement number of cycles; and
   e) determining the rotational speed based upon a current number of clock pulses counted during the measurement number of cycles of the cyclical input and based upon the measurement number of cycles.

16. A speed sensor comprising:
   a gear having a plurality of circumferentially-spaced teeth;
   a magnetic pickup proximate the teeth and generating a cyclical output having a frequency that varies based upon a rotational speed of the gear;
   a record length register for storing a record length indicating a measurement period of the cyclical input during which to measure rotational speed;
   a clock pulse generator generating clock pulses during each measurement period;
   a clock pulse counter counting the clock pulses generated by the clock pulse generator during the measurement period as indicated by the record length;
   a cycle counter for counting cycles of the cyclical input, the cycle counter being compared to the record length register, wherein the clock pulse counter stops counting clock pulses based upon the comparison between the cycle counter and the record length register; and
   a controller changing the record length stored in the record length register based upon a previous value in the clock pulse counter, the controller determining a speed based upon the clock pulses counted by the clock pulse counter and the record length stored in the record length register.

17. The speed sensor of claim 16 wherein the controller increases the record length when the previous value in the clock pulse counter drops below a low threshold.

18. The speed sensor of claim 17 wherein the controller decreases the record length when the previous value in the clock pulse counter exceeds a high threshold.

* * * * *